(12) United States Patent
Hart

(10) Patent No.: US 6,776,268 B2
(45) Date of Patent: Aug. 17, 2004

(54) UNITIZED RAILCAR BRAKE EQUIPMENT

(75) Inventor: James E. Hart, Trafford, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 118 days.

(21) Appl. No.: 10/166,323

(22) Filed: Jun. 29, 2001

(65) Prior Publication Data
US 2003/0085084 A1 May 8, 2003

(51) Int. Cl.[7] .............................................. B60T 13/00
(52) U.S. Cl. ................................. 188/153 R; 303/15
(58) Field of Search ........................ 188/153 R, 153 D; 303/3, 15, 16, 35

(56) References Cited

U.S. PATENT DOCUMENTS

| 3,910,639 | A | * | 10/1975 | Engle | 303/3 |
| RE30,408 | E | | 9/1980 | Hart | |
| 4,378,950 | A | * | 4/1983 | Hart et al. | 303/36 |
| 4,405,182 | A | * | 9/1983 | Hart | 303/22.2 |
| 4,418,799 | A | | 12/1983 | Hart et al. | |
| 4,494,631 | A | * | 1/1985 | Billeter | 188/153 R |
| 4,557,181 | A | * | 12/1985 | Hart et al. | 91/519 |
| 5,564,794 | A | * | 10/1996 | Hart | 303/3 |
| 5,794,739 | A | * | 8/1998 | Ring et al. | 188/153 R |
| 6,250,723 | B1 | * | 6/2001 | Barberis et al. | 303/7 |
| 6,325,464 | B2 | * | 12/2001 | Truglio et al. | 303/7 |

* cited by examiner

Primary Examiner—Douglas C. Butler
Assistant Examiner—Bradley King
(74) Attorney, Agent, or Firm—Buchanan Ingersoll, P.C.

(57) ABSTRACT

A unitized railcar brake equipment can have a relatively small, integrated air supply and can be controlled electronically. The equipment can have a brake cylinder portion and a control valve portion. The brake cylinder portion can have a brake cylinder housing a piston head with a rod end of the piston connected to a railcar brake member. A pair of air chambers communicate on opposite sides of the piston head and an air reservoir can be integral with the brake cylinder housing. Selective coupling of the air chambers and the air reservoir to each other, a source of pressure, or to the atmosphere can be controlled by appropriate valves to control the pressure in the brake cylinder.

10 Claims, 7 Drawing Sheets

UNITIZED RAILCAR BRAKE EQUIPMENT

CROSS-REFERENCE TO RELATED APPLICATION

This application is based upon copending U.S. Provisional Patent Application Ser. No. 60/302,319, filed Jun. 29, 2001.

BACKGROUND OF THE INVENTION

The present invention relates generally to controlling brakes on a train of railcars, and more particularly to highly efficient, unitized railcar brake equipment that is based on electronic control of a pneumatically operated, stand-alone brake cylinder that can have a small, integrated air supply volume.

Historically, braking on railcars can has been implemented using pneumatic brake equipment provided on each railcar. Such prior art equipment typically can include a control valve which is connected to a brake pipe that interconnects the locomotive and each railcar in the train. The brake equipment on each car further can include a two compartment reservoir of pressurized air which the control valve can utilize to pressurize the brake cylinder on the car.

U.S. Pat. No. Re. 30,408, reissued Sep. 30, 1981, to the assignee of the present application, discloses railway brake apparatus including a brake cylinder device and a control valve device. The usual air reservoirs associated with conventional pneumatic brake equipment can be minimized or eliminated in the disclosed apparatus in favor of storing the compressed air within the brake cylinder device itself. The brake cylinder device disclosed embodies a pair of tandem-connected pistons of unequal diameter, the larger piston cooperating with the brake cylinder body to form on the respective opposite sides of this piston two chambers that are charged with compressed air via the train brake pipe, and in which chambers the air required for use by the brake apparatus, including the brake cylinder device, is stored. The aforementioned control valve device operates in response to variations in the train brake pipe pressure to control the transfer of air stored in the brake cylinder device, so as to develop differential forces across the respective pistons thereof and thereby effect a brake application and brake release. In addition to the, typical packing cup type pressure seals associated with the respective pistons of this brake cylinder device, there are several additional areas in which dynamic sealing is required, all of which are critical in the sense that leakage thereat affects the desired operation of the brake cylinder device. Further, passageways are required in the body of the brake cylinder device to conduct pressure between the control valve device and brake cylinder operating components. It is well known that the expense in the manufacture of a casting increases with the complexity in the configuration of these passages, as well as in the shape of the casting itself.

U.S. Pat. No. 4,418,799, issued Dec. 6, 1983 to the assignee of the resent application, discloses a pneumatic brake cylinder device which improves upon the brake cylinder device disclosed in Re 30,408. This brake cylinder device employs a pair of different sized fluid motors, the pressure chambers of which serve as air storage reservoirs. The cylinder of the larger fluid motor is formed by the main casting and contains a larger piston, while the cylinder of the smaller fluid motor is mounted to the main casting in coaxial relationship with the larger cylinder and contains a smaller piston having an elongated hollow body that is connected at its open, end to one side of the larger piston to form a pressure chamber therebetween. The smaller, positioning piston fits within the smaller cylinder in spaced-apart relationship therewith to form a pressure chamber delimited by a seal fixed on the main casting for engagement with the piston periphery at any point along its longitudinal axis. The larger, power piston cooperates with the larger cylinder to form pressure chambers on opposite sides thereof. As compared to the device disclosed in Re 30,408, the arrangement in U.S. Pat. No. 4,418,722 provides for a design employing fewer seals and a simplified main casting in which all the passages to the respective pressure chambers are contained. A similarity between the two devices is that a pair of pistons are employed, wherein the smaller piston displaces the larger piston in order to provide a brake application. As the smaller, positioning piston drives the larger, power piston air is transferred from an air chamber behind the power piston into a chamber on top of the positioning piston. In an emergency application, air in the chamber behind the power piston can be vented while air from a third chamber is coupled to the chamber on top of the positioning piston. To release the brakes, the chamber on top of the positioning piston is vented and the chamber behind the power piston is recharged.

Railcar brake equipment including the two brake equipment devices described above, historically initiate brake application and release operations on the railcar based upon pneumatic brake commands from a brake control valve on a locomotive. These pneumatic commands are typically communicated to each railcar by causing pressure changes in a brake pipe connecting each railcar to the locomotive brake control valve. In the past, and particularly on freight cars operating in North America, the railcar brake equipment, including the specific brake equipment described above, can only implement a "direct" release of brakes on the railcar. Direct release means that the pressure in the brake cylinder on the railcar can only be fully released, as opposed to gradually releasing the pressure to gradually reduce the braking force. However, some pneumatically operated brake equipment has been disclosed which can provided graduated release capability. Additionally, graduated release of railcar brakes has recently been the target of brake system development in the American railway system and can be implemented using what is commonly referred to today as electrically controlled pneumatic (ECP) braking systems. ECP braking systems use specialized equipment on locomotives and railcars whereby brake command signals are generally instantaneously communicated, via a hardwired trainline or RF communications, between the locomotive and each railcar. The ECP brake equipment on each railcar typically utilizes solenoid type valves to control the air pressure in the brake cylinders, and are thus easily controllable to gradually increase or decrease the level of braking on each railcar. However, use of ECP braking systems can require a trainline, wire or RF communication equipment and electronic control valves on each railcars, as well as electronic control systems on the locomotive.

SUMMARY

An efficient, unitized railcar brake equipment can be provided wherein a pneumatically operated, stand-alone brake cylinder can have a relatively small, integrated air supply volume which can be selectively coupled to opposite sides of a single piston for gradually applying or releasing the brakes on the railcar. The unitized brake equipment can be operated without, or independently of, a conventional pneumatic control valve, and can be controlled from a locomotive in an ECP manner using, for example, a trainline or an RF communication system. Furthermore, the unitized brake equipment could automatically initiate a full pneumatic brake application responsive to a loss of brake pipe pressure, without electronic intervention or control. The unitized brake equipment can include a brake cylinder and a piston member housed therein with a first air chamber in communication with the face of the piston and a second air chamber in communication with the opposite side of the piston. An air reservoir can also be provided, and can be formed as an integral part of the brake cylinder. The first and second air chambers and the air reservoir can be interconnected by air passages and controlled by valves, so that they may be selectively coupled and uncoupled to control pressure in the brake cylinder. Some of the valves can be electrically operated remotely, for example, by a train engineer, to control air pressure in the brake cylinder to operate the brakes on the railcar. Additionally, some valves can be configured to operate automatically in response to fluid pressure conditions prevailing in the air passages in the unitized brake equipment, or pressure conditions in the brake pipe, to which the unitized brake equipment can be connected. The unitized brake equipment can be supplied with pressurized air from, for example, the brake pipe for charging the reservoir and/or the first and second air chambers. Additionally, the unitized brake equipment can be selectively vented to the atmosphere, for example, by appropriate valves, for reducing the pressure in the brake cylinder. The valves for controlling the air pressure in the various chambers and reservoir can be provided as components of an electronic control valve portion, which can be mounted on the front or rear of the brake cylinder, via a pipe-bracket type of interface. The interface can be a separate component or can be formed as an integral part of the brake cylinder.

The unitized brake equipment can employ a "self-actuating" brake cylinder, wherein air pressure is admissible to both sides of the piston, but acts on unequal effective areas provided on the opposing sides. For example, the face of the piston can be provided with a larger effective area such that it has an effective advantage over the opposite side of the piston. The unitized brake equipment can be designed such that, in release position, the internal volume of the first chamber, acting on the face of the piston, is relatively small, whereas the largest portion of the internal volume of the brake cylinder can be provided as the second chamber, which acts on the opposite side of the piston. The second chamber can thus also be utilized as an integrated air reservoir. To apply the brakes, the piston is forced to the applied position simply by connecting the air chambers on either side of the piston, and allowing the pressure on the face of the piston to approach the pressure on the opposite side, due to the area advantage. To thereafter reduce pressure in the brake cylinder, the smaller first air chamber acting on the face of the piston can be controllably exhausted to the atmosphere. Because much of the volume of air stored on the opposite side of the piston is simply transferred to the face of the piston in moving the piston to apply the brakes, only a relatively small volume of air is left on the opposite side of the piston when piston travel is completed and the brakes are fully applied. Thereafter, the pressure of this small volume can easily be incrementally increased or reduced, to gradually apply or release braking force by any degree desired, while using relatively little compressed air.

Other advantages of the unitized brake equipment over conventional ECP (all electric) controlled brake equipment can, in some instances result in reduced cost, size and weight. Further advantages can include simplified piping and installation, higher braking force capability from a given initial pressure, reduced consumption of pressurized air, and faster train charging and recharging. With the unitized brake equipment, the separate air storage or supply reservoirs and associated piping used with conventional railcar brake equipment can be eliminated, as can be the separate pipe bracket.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1A:
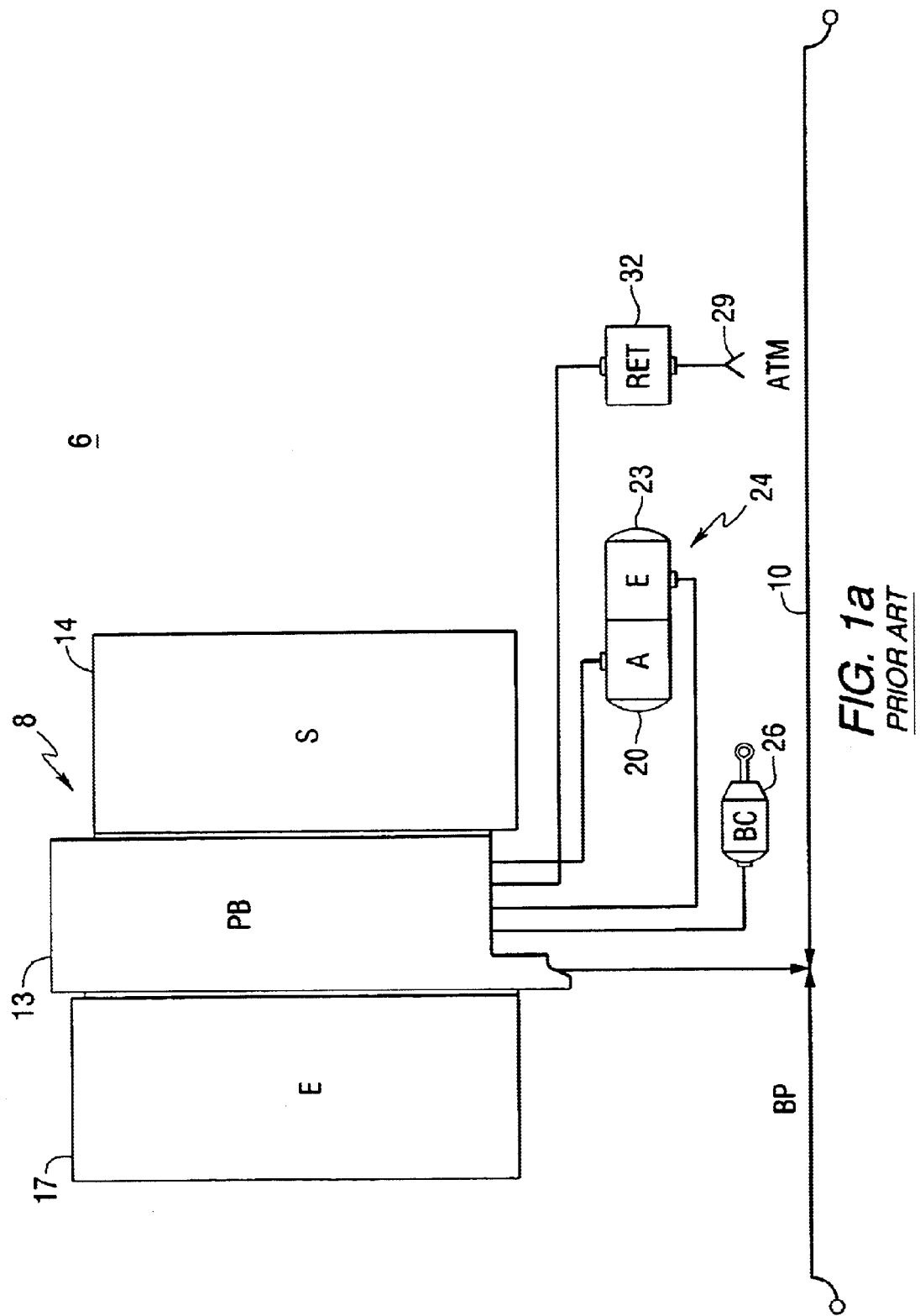
FIG. 1a is a diagrammatic drawing of prior art type pneumatic railcar braking equipment.
Figure 1B:
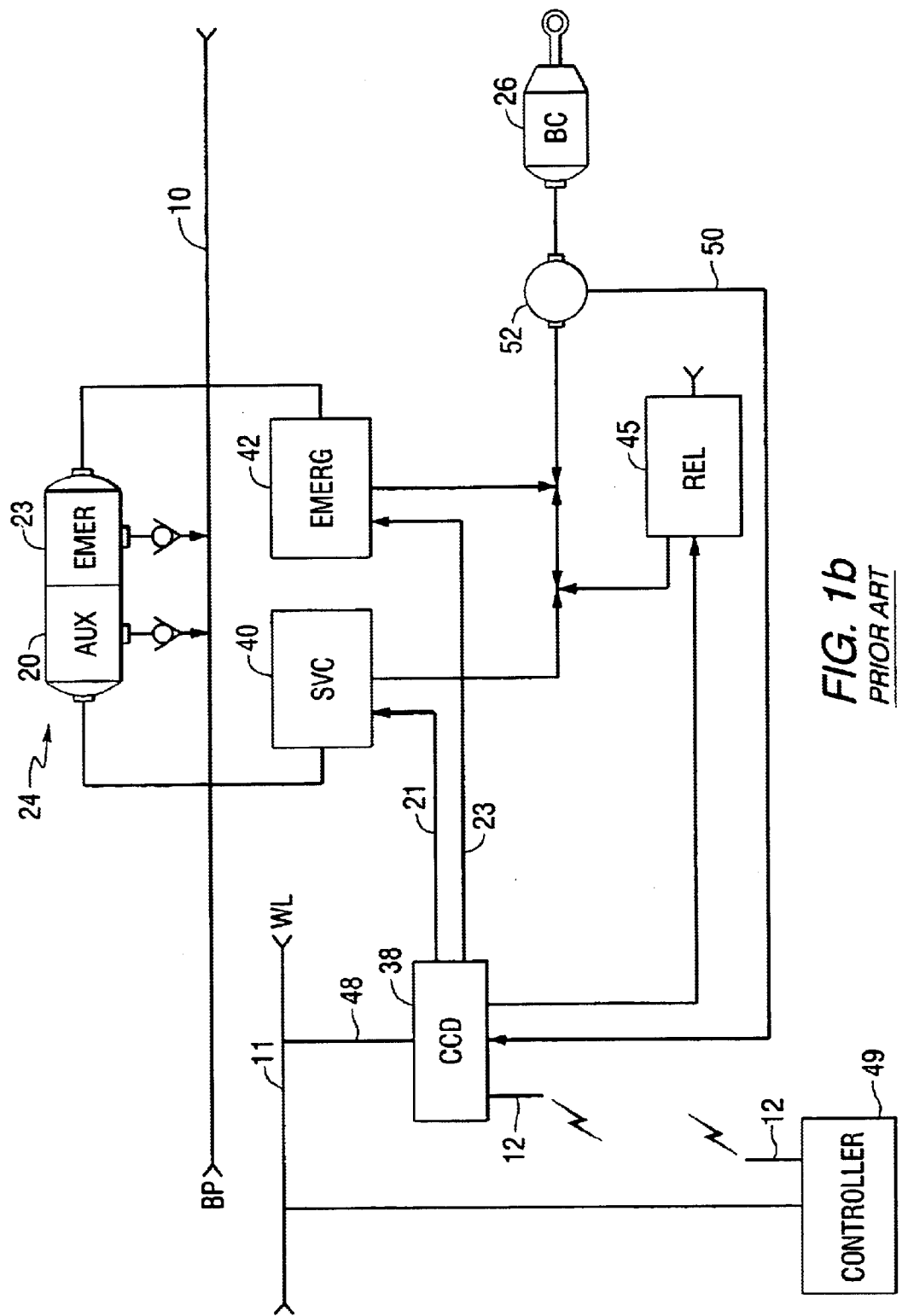
FIG. 1b is a diagrammatic drawing of prior art type ECP railcar braking equipment.

An example of a prior art type all-pneumatic railcar braking system is illustrated in FIG. 1a, whereas an example of a prior art type ECP railcar braking system is illustrated in FIG. 1b. These two drawing figures are provided for purposes of a general comparison of the prior art type braking equipment with the unitized railcar brake equipment according to the present invention. Such a comparison will likely enable greater understanding and appreciation of the invention, certain preferred embodiments of which are described in more detail hereinafter in connection with FIGS. 2 through 6.

As shown in FIG. 1a, the prior art type fully pneumatic railcar brake equipment 6 typically can include a standard pneumatic control valve 8, such as an ABD, ABDX or ABDW, manufactured by Westinghouse Airbrake Technologies Corporation ("WABTEC™"). The brake pipe ("BP") 10 connects to the central portion 13, i.e. the "pipe bracket," of the pneumatic control valve 8. Service 14 and emergency 17 portions of the pneumatic control valve 8 are mounted on either side of the pipe-bracket 12. The pipe-bracket 13 also communicates with auxiliary 20 and emergency 23 reservoir compartments of a dual compartment reservoir 24, the brake cylinder 26 and the atmosphere 29, usually through a retainer device 32. The total volume of the conventional dual compartment reservoir is typically about 6000 cubic inches. Each reservoir compartment 20, 23 is pressurized from the brake pipe, 10 via internal passages in the pipe-bracket 13. Similarly, pressurized air is selectively communicated by the pneumatic control valve, 8 via internal passages in the pipe-bracket 13, between the reservoir compartments 20, 23, the service 14 and emergency 17 portions, the brake cylinder 26, and the atmosphere 29, in order to control the air pressure in the brake cylinder 26 and thus the braking and release functions on the railcar.

Referring now to FIG. 1b, a prior art type ECP railcar brake equipment is illustrated typically including a local brake control device, such as an electronic car control device ("CCD") 38, which can control a pair of application valves 40, 42 to supply pressurized air from the dual compartment reservoir 24 to the brake cylinder 26. The CCD 38 also normally controls a release valve 45 to reduce pressure in the brake cylinder 26. As with the fully pneumatic brake control equipment shown in FIG. 1a, the brake pipe 10 is utilized to supply pressurized air to each compartment 20, 23 of the dual compartment reservoir 24. In this case however, each compartment 20, 23, of the reservoir 24, can be individually connected to the brake pipe 10 for maintaining pressurization thereof. Back-flow check valves 35, 36 are also typically provided between each compartment 20, 23 so that pressure cannot escape back into the BP 10 if the pressure therein reduces below the prevailing pressure in either reservoir compartment 20. 23. As shown the separate Wake application valves 40, 42 can be connected between each reservoir compartment 20, 23, respectively, and the brake cylinder 26, with the auxiliary reservoir 20 connected to the auxiliary application valve 40 and the emergency reservoir 23 connected to the emergency application valve 42. As mentioned above, the service and emergency brake application valves 40, 42 can be controlled by the CCD 38 to selectively communicate one or both of the reservoir compartments 20, 23 with the brake cylinder 26 to increase braking force on the railcar. Although not shown, the brake cylinder 26 is conventionally connected to a linkage, commonly referred to as brake "rigging," for actuating the rigging to apply brake shoes to the wheels of the railcar. The CCD 38 can control the release valve 45 for venting the brake cylinder 26 to reduce the pressure therein and reduce braking force on the railcar. The CCD 38 can be controlled by a remote brake controller. In particular, the CCD 38 can receive command signals 48 from a train engineer using a brake controller 49, which can be remotely located on a locomotive and cam control the CCD 38 via a wireline 11 or wireless communications, such as an RF communication system 12. The CCD 38 can also receive feedback 50 from a pressure sensor 52 which monitors the pressure in the brake cylinder. 26. Additional pressure sensors, although not shown, could be provided at other locations, such as the reservoir compartments 20, 23 and along the brake pipe 10, to monitor the pressure at those locations for added feedback.

Figure 2:
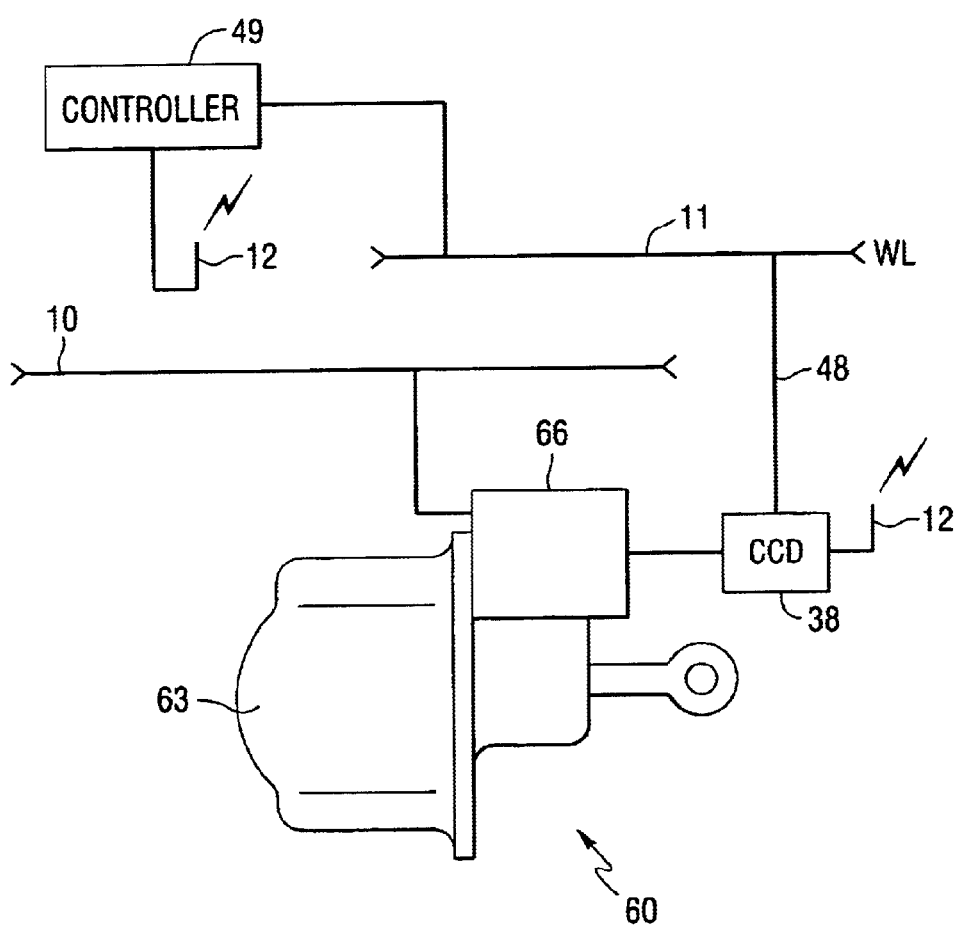
FIG. 2a is a diagram showing a presently preferred embodiment.

A train brake system employing an embodiment of a unitized railcar brake equipment 60 according to the invention is illustrated diagrammatically in FIG. 2. As shown, the unitized brake equipment 60 car generally comprise a brake cylinder portion 63 and an electronic control valve portion 66, and can be controlled by a local brake control device, such as the CCD 38 to regulate braking on the railcar. However, in contrast to the brake system in FIG. 1a, a brake system having the unitized brake equipment 60 need not have a reservoir 24, or application 40, 42 and release 45 valves, since these functions can all be combined into the unitized brake equipment 60. This can result in a simpler, lighter braking system which can still have the advantages of an ECP type system, for example one such as shown in FIG. 1a. The unitized brake equipment can supplied with pressurized air via a pneumatic connection with the BP 10 and can be electrically connected to the CCD 38 for control thereby. More specific details of the brake cylinder portion 63 and the electronic control valve portion 66 are provided below. As with the ECP type system illustrated in FIG. 1b, the CCD 38 can receive commands from a remote brake control device, such as controller 49, by signals transmitted via wireline 11 or wirelessly, such as by an RF communications system 12.

Figure 3:
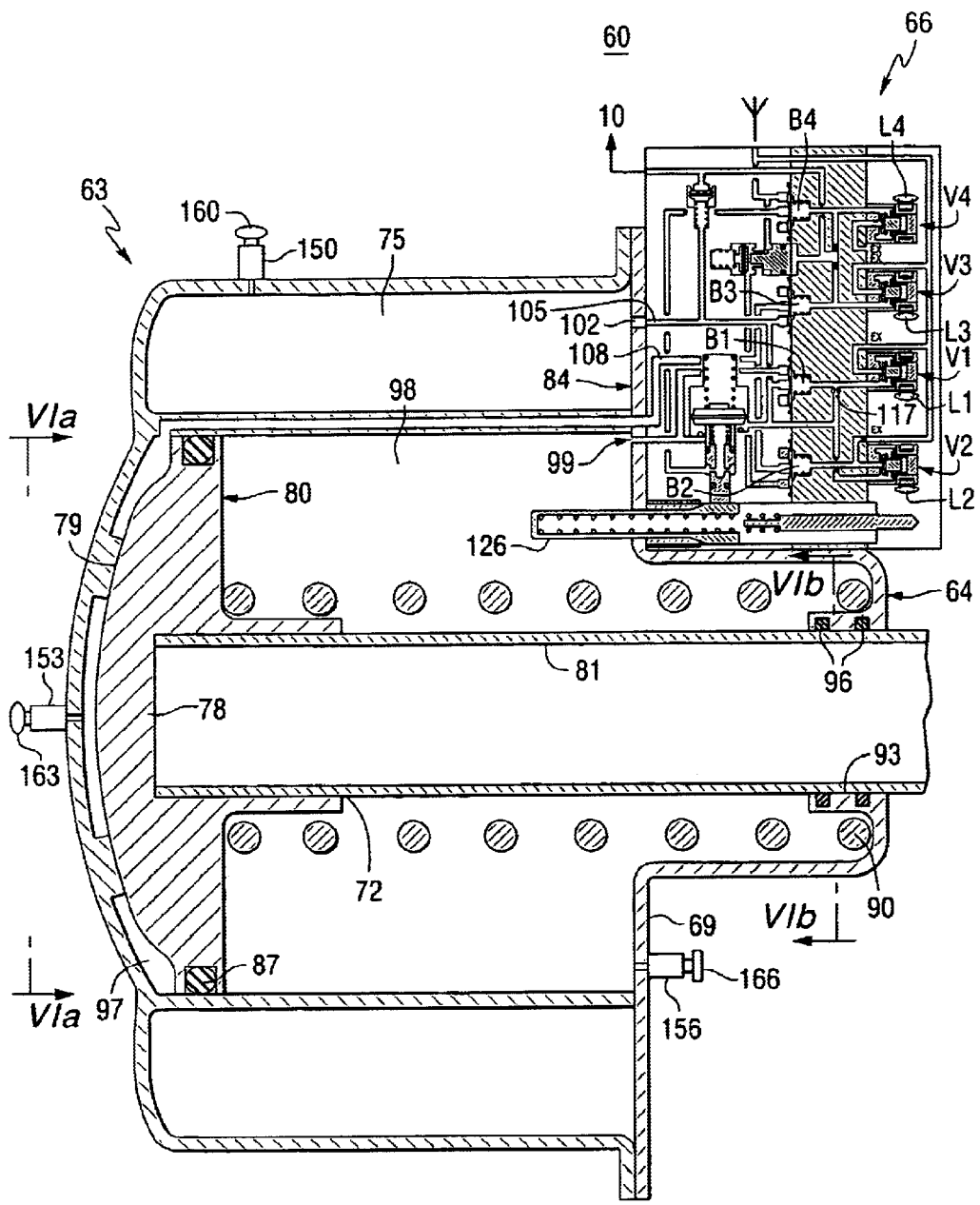
FIG. 3 is a diagrammatic drawing of the unitized brake equipment with the piston shown in a release position.
Figure 4:
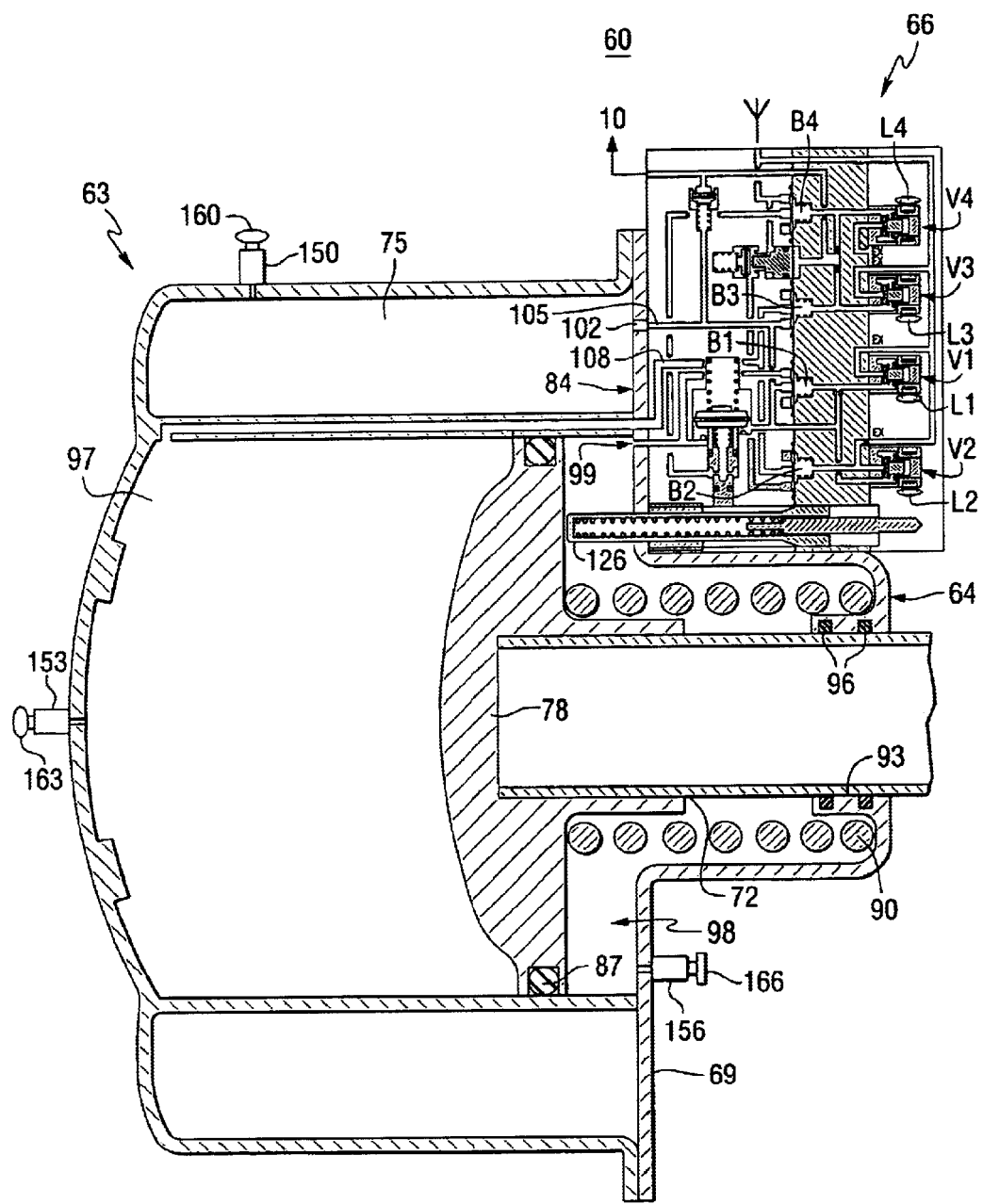
FIG. 4 is a diagrammatic drawing of the unitized brake equipment of FIG. 3, except shown with the piston in an applied position.

Referring to more detailed views in FIGS. 3 and 4, the electronic control valve portion 66 can be mounted directly to the pneumatic brake cylinder portion 63. The brake cylinder 63 portion can be comprised of several members, namely—a brake cylinder 69, a piston 72 operably disposed in the brake cylinder 69, and an air reservoir 75 generally circumscribing the brake cylinder 69. The piston 72 can include a piston head 78 and a push rod 81 connected to the back side 80 of the piston head 78. Although not shown, it should be understood that the opposite end of the push rod 81 can be connected to rigging for applying brake shoes to the wheels of the railcar.

In addition to the air reservoir 75, the volume within the brake cylinder 63 itself can serve as an additional reservoir of pressurized air. Moreover, the brake cylinder 63 can have a pipe bracket interface member 84, to which the electronic control valve 66 can be mounted, as shown in the drawing figures. A first bi-directional seal 87, as opposed to a single direction packing cup which may typically be used, can be provided between the piston head 78 and the brake cylinder 69. Also, a mechanical return spring 90 can be provided acting on the back side 80 of the piston head 78. The push rod 81 can be hollow, and the end opposite the end connected to the piston head 78 can extend through an opening provided in a front cover member 64 of the pneumatic brake cylinder portion 63 for connection to brake rigging for applying brake shoes to the wheels of the railcar. A second, sliding air seal 96 can be provided between the push rod 81 and the front cover 64. The brake cylinder portion 69 can comprise two chambers: an application chamber 97, or "chamber A," communicating on the face 79 of the piston head 78; and a release chamber 98, or "chamber R," communicating on the back side 80 of the piston head 78. The reservoir 75 can be an annular volume provided encircling the brake cylinder 69. In one embodiment, the combined stored air volume of chambers; 97, chamber R 98, and the reservoir 75, can be about 2000 cubic inches, wherein the reservoir 75 can be about 150 cubic inches, and chamber R 98 can be about 850 cubic inches in release position. In the release position, the volume of chamber A 97 is generally negligible. In comparison, conventional freight railcar brake equipment typically can have a total air reservoir volume of 6000 cubic inches. The overall size of the unitized brake equipment 60 can be very compact, for example—only about 18 inches in diameter and about 14 inches in length. Moreover, with the unitized brake equipment 60, the separate air storage or supply reservoirs and associated piping used with conventional brake equipment can be eliminated, as can the separate pipe bracket.

The electronic control valve portion 66 can preferably be mounted to the front of the brake cylinder 63, as depicted in the drawing figures. Alternatively, the electronic control valve 66 could be mounted to the back of the brake cylinder portion 63, which would provide similar direct access to the internal brake cylinder 69 chambers A 97, R 98 and the reservoir 75, but would not need to avoid the piston push rod 81. However, such a rear mounting may not be as readily accessible on bulk commodity freight cars as a front mounted embodiment. The requisite internal passages can be provided in the pipe bracket interface member 84, for example, passages 99 and 102. These internal passages can mate with corresponding internal passages provided in the electronic control valve portion 66, for example, passages 105, 108. The mating internal passages can provide for controlled access by employing appropriate valves, for example, V1–V4, in the electronic control valve portion 66 between the reservoir 75, chambers A 97 and R 98, brake pipe 10, and the atmosphere, via passage 109. The various internal passages and associated valves for controlling pressures in the different air volumes will be described in more detail below, primarily in connection with the enlarged view of the control valve portion 66 shown in FIG. 5.

FIG. 3 portrays the unitized brake equipment 60 with the piston 72 in a release position, whereas FIG. 4 shows the piston 72 in the applied position. As displayed in both figures, chamber A 97 communicates with the face, e.g., the application side, of the piston head 78 and chamber R 98 communicates on the opposite side, e.g., the release side, of the piston head 78. The reservoir 75 can be formed integral with the brake cylinder 63, and in one presently preferred embodiment, can be provided in the form of an annular volume which encircles the brake cylinder 63.

The unitized brake equipment 60 can be "self-actuating," such that air pressure can be applied to both sides of the piston head 78, but acts on unequal surface areas provided on the opposing sides. For example, the face of the piston head 78 can be provided with a larger surface area such that it can have an effective advantage over the opposite side of the piston head 78. The unitized brake equipment 60 can be designed such that, in release position, the application chamber A 97 is relatively small, whereas the largest portion of the internal volume, i.e., the release chamber R 98, can be provided on the opposite side of the piston head 78. The release chamber R 98 can be charged to the brake pipe pressure, for example, from the brake pipe 10, and can be used as an additional air supply along with the air reservoir. 75. The piston 72 can be forced to the applied position merely by coupling the application chamber A 97 with the release chamber R 98, thereby permitting the pressure in each chamber to approach equalization. In one embodiment, a return spring 90 can be provided on the release side of the piston head 78, in opposition to pressure acting on the face of the piston head 78. The force required to overcome the return spring 90 and move the piston 72 can be derived from providing an effective surface area advantage provided on the application side of the piston head 78, with respect to the surface area provided on the opposite, release side of the piston head 78. Advantageously, as the piston 72 is moved, much of the stored volume of air in chamber R 98 is simply transferred to chamber A 97, thus leaving a relatively small "operable volume," of, for example, only about 200 cubic inches, or less, in chamber R 98 when the brakes are fully applied. In contrast, the operable volume of a conventional brake cylinder can typically be more than 600 cubic inches. After the piston 72 has been moved to apply the brakes, the pressure of the relatively small remaining volume in chamber R 98 can be incrementally increased, or reduced, to gradually adjust braking force by essentially any degree desired. Moreover, this can all be accomplished using relatively little compressed air.

Figure 5:
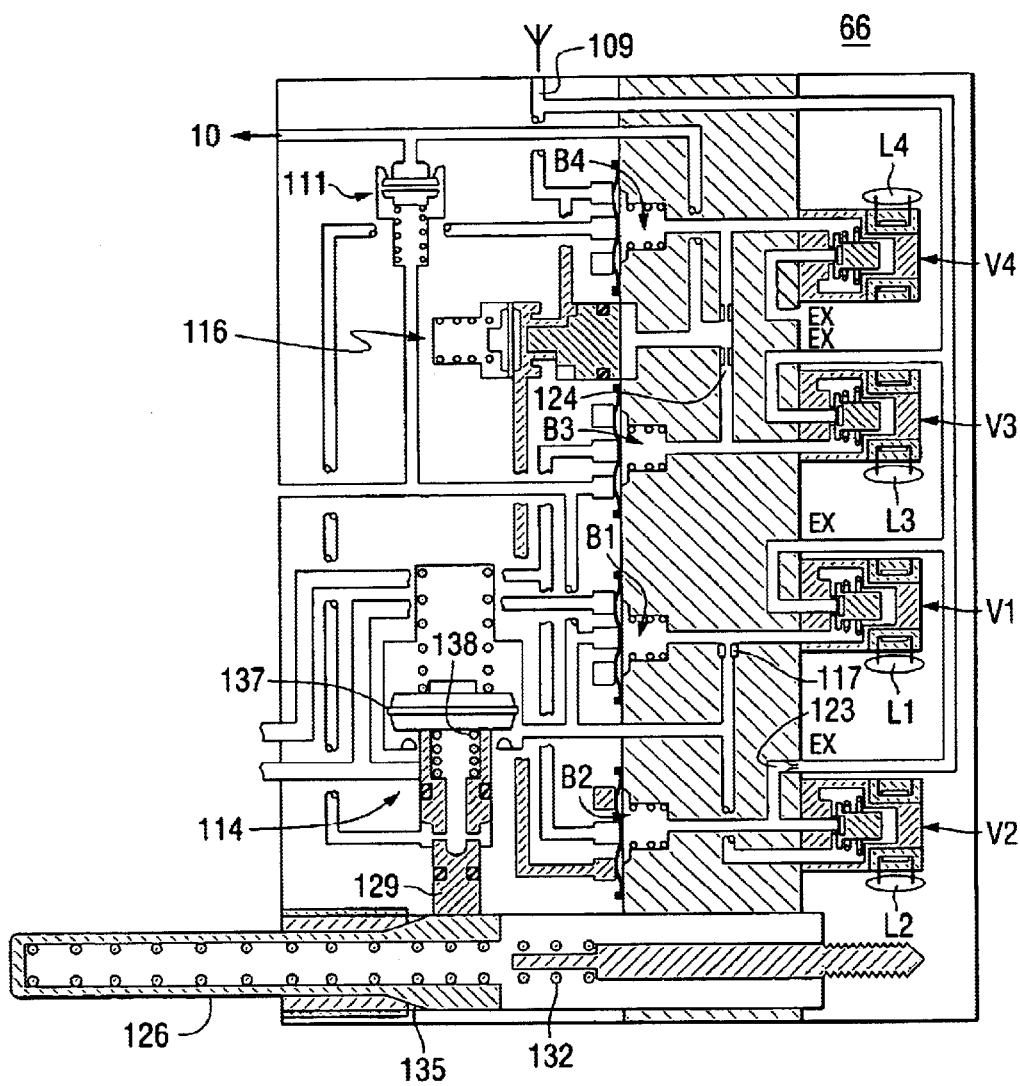
FIG. 5 is a larger diagrammatic drawing of the electronic control valve portion of the unitized brake equipment shown in FIG. 3.
Figure 6A:
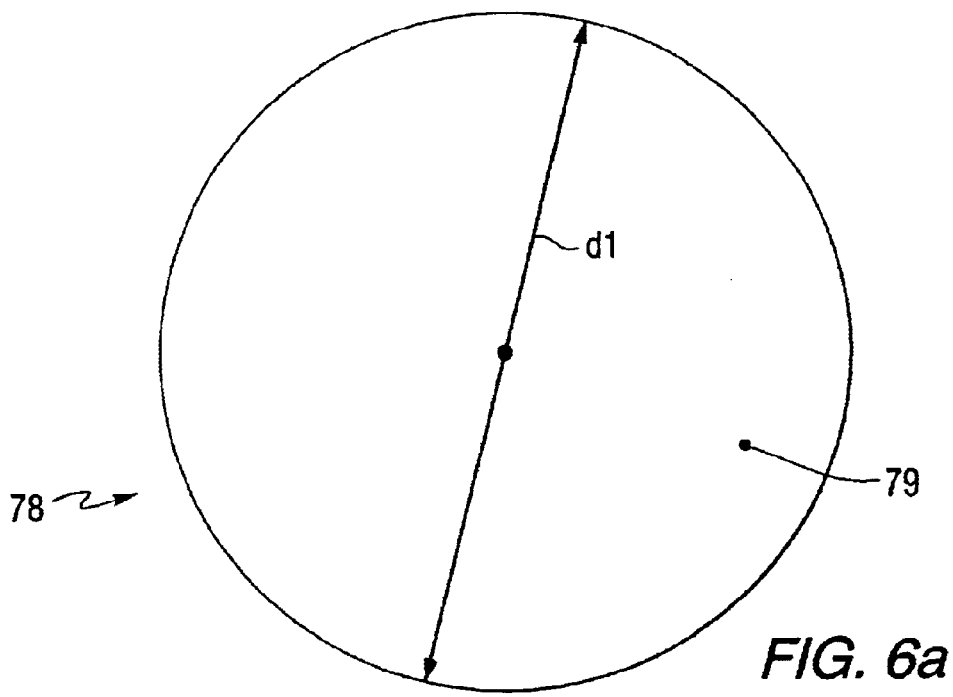
FIGS. 6a and 6b illustrate the concept of "offset area."
Figure 6B:
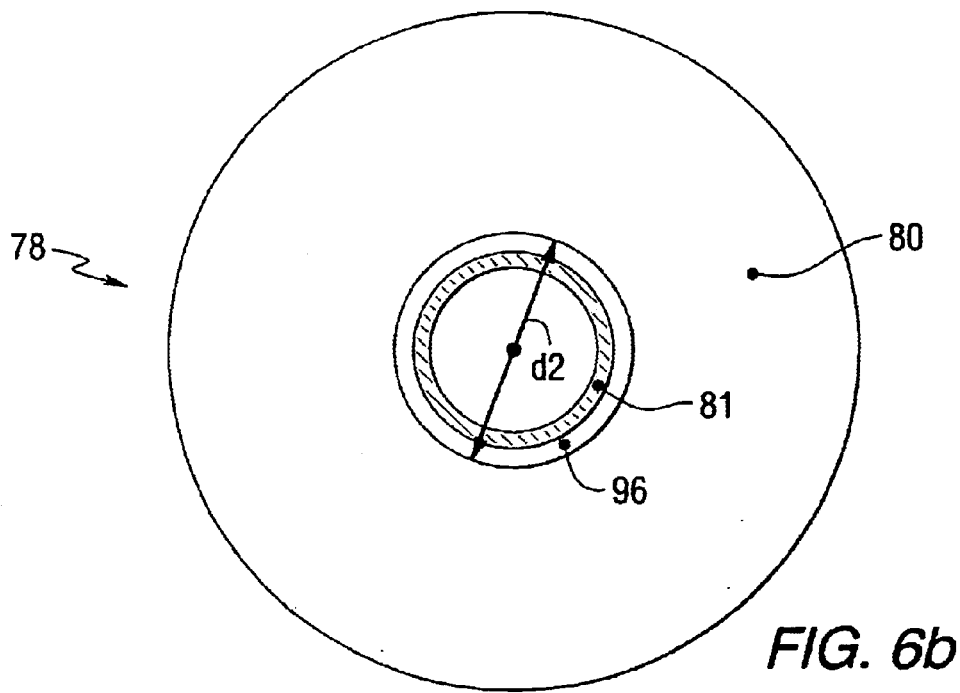

In one embodiment, shown best in FIG. 5, the electronic control valve portion 66 can include four small, electrically operated valves, for example, miniature solenoid valves V1–V4. Each valve V1–V4 can be paired with, and can also serve as a pilot to, separate pneumatic booster valves B1–B4 having higher air flow capacities than the smaller solenoid valves V1–V4. The electronic control valve portion 66 also can include a charging check-valve 111, a pneumatic interlock valve 114 (which can be configured for automatic actuation in response to movement of the piston 72), and a cut-off valve 116 that can serve to cut off the exhaust of application chamber A 97 pressure in the event of a substantial loss of brake pipe 10 pressure. In one illustrated in FIG. 4, a full stroke of the piston 72 can automatically actuate the pneumatic interlock valve 114.

Solenoid valve V1 and its diaphragm booster valve B1 can control air communication between the reservoir 75 and chamber R 98. The reservoir pressure 75 can serve as a source for pilot air pressure, which normally holds booster diaphragm valve B1 closed. When solenoid valve V1 is energized, it opens to quickly exhaust the pilot pressure against a very small feed choke 117, allowing pressure in the reservoir 75 and chamber R 98 to force the diaphragm of booster valve B1 off its seat, against a light spring 120, and connect chamber R 98 with the reservoir 75.

Solenoid valve V2 and its diaphragm booster valve B2 can control the flow of air under pressure from chamber A 97 to atmosphere via passage 109. When energized, valve V2 isolates chamber A 97 from the atmosphere, and when de-energized connects it. Reservoir 75 air is used as the pilot pressure, which is admitted by solenoid valve V2, when energized, to close the diaphragm booster valve B2. The pilot pressure is open to a small bleed hole 123, which introduces a very small amount of leakage flow against an essentially overwhelming supply when valve V2 is activated, but exhausts the small pilot volume quickly once the valve V2 is closed.

Solenoid valve V3, in conjunction with its diaphragm booster valve B3, can control air communication between the reservoir 75 and chamber A 97. Brake pipe 10 pressure can be used as the source for pilot air pressure for valve V3, which normally holds the diaphragm booster valve B3 closed, disconnecting chamber A 97 from the reservoir 75. When valve V3 is energized, it exhausts the pilot pressure against a small feed choke 124, allowing booster valve V3 to open and connect chamber A 27 to the reservoir 75. It is also noteworthy that the loss of brake pipe 10 pressure, even without energization of valve V3, will cause the pilot pressure to be lost and allow booster valve B3 to open.

Solenoid valve V4 and its diaphragm booster valve B4 can control the flow of air under pressure from chamber A 98 to the atmosphere via passage 109. When de-energized, valve V4 isolates chamber R 48 from the atmosphere and when energized connects it. Similarly to valve V3, pressure in the brake pipe 10 can be used as the source of pilot air pressure to normally hold booster valve B4 closed, and thus the depletion of brake pipe pressure will allow booster valve B4 to open even without energization of valve V4.

A piston-travel interlock valve 114 can be designed to work in concert with booster valves B3 and B4 of solenoid valves V3 and V4 to bring about an automatic full application of the brakes responsive to a loss of pressure in the brake pipe 10. Such an application requires no electronic valve actuation. The piston-travel interlock valve 114 acts in parallel with valve V1 to connect the reservoir 75 with chamber R 98 in release position, and a in series with valve V4 to control the exhaust of chamber R 98 to atmosphere in the applied position. Reservoir 75 can communicate with the top of the interlock valve 114 and a beveled stem 126 can actuate the interlock valve 114. The beveled stem 126 can be positioned laterally perpendicular to and abutting the end of the interlock operating valve stem 129. The beveled stem 126 protrudes into the release chamber R 98 of the brake cylinder 63 and is contacted and driven forward by the piston 72 when full piston travel is approached, as shown in FIG. 4. When the piston 72 is in its normal release position, a spring 132 forces the beveled stem 126 outward, causing a ramp profile 135 on the beveled stem 126 to laterally displace the interlock valve stem 129. As it moves, the interlock valve stem 129 first seats on the interlock check valve member 137, cutting off the connection of chamber R 98 from atmosphere, and then forces open the check valve member 137 from its stationary seat, connecting chamber R 98 to the reservoir 75. When brakes on the railcar are applied and the piston 72 approaches its full travel, it contacts and forces the protruding beveled stem 126 to retract. The beveled stem 126 then allows the interlock valve stem 129 to be displaced downward by the interlock check valve spring 138, permitting the interlock check valve member to re-seat, cutting off the reservoir 75 from chamber R 98. The interlock valve stem 129 is also free to then be forced away from the interlock check valve member 137 under the influence of the check valve spring 138, thus connecting chamber R 98 to booster valve B4, and to atmosphere if B4 is also open. Because the interlock valve 114 is arranged in series with booster valve B4, no air pressure can be exhaust from chamber R 98, unless both the interlock valve 114 and booster valve B4 are open. The interlock valve 114 is only open when the piston 72 is in applied position. Booster valve B4 can be opened either as a result of V being energized under electronic control or by the external depletion of brake pipe pressure from the pilot chamber of valve B4.

Solenoid valve V1, which controls communication between chamber R and the reservoir 75, can also be used in combination with the piston-travel interlock valve 114 to perform electronic graduated release. Additionally, a simple brake cylinder release valve (not shown) could also be employed to allow manual brake cylinder release, by venting chamber 97 to drain off air pressure without electrical control.

Because valve V2 must be energized in order to isolate chamber A 97 from exhaust and retain pressure during an application, pneumatic cut-off valve 116 can be provided in series with booster valve B2. Brake pipe 10 pressure communicates on one side of the pneumatic cut-off valve 116 and holds the valve open to connect chamber A to atmosphere, with V2 controlling the connection of chamber A to cut-off valve 116. In the event of a power failure, V2 would connect chamber A to exhaust. However, in such case cut-off valve 116 can block the exhaust of chamber A 97 when brake pipe 10 pressure is depleted, thereby permitting retention of chamber A 97 pressure during the pneumatic application. If a power failure should occur during a brake application, and brake pipe pressure were not depleted, V2 would exhaust chamber A. All of this can be best understood from FIG. 4. Releasing the brakes on an individual railcar experiencing a power failure can be the desired fault condition. However, if this condition were to occur on the whole train of railcars, or a certain number of railcars in the train, an emergency application could be commanded. A loss of brake pipe pressure would automatically close the cut-off valve 116, cutting off chamber A from atmosphere, and would also automatically open booster valve B3, thereby connecting chamber A to the reservoir.

As a general principle of operation, the unitized brake equipment 60 relies on the control of pressures that act on unequal effective areas across the piston 72 to apply and release the brakes on the railcar. Referring back to FIG. 3, in release position chamber A 97 is vented to atmosphere, which allows the return spring 90 and the pressure in chamber R. 98 to force the piston 72 to its fully retracted position. When the brakes are to be applied, first the reservoir 75 pressure is admitted to chamber A 97 via valve V3. Because the reservoir 75 is also connected to chamber R 98 at this time via valve V1, all three chambers 75, 97, 98 will tend to equalize in pressure. Based on selected design volumes for the three chambers 75, 97, 98 and the specific area unbalance, full equalization would generally cause a reduction of pressure in the reservoir 75 and chamber R 98 on the order of about 5 psi. Therefore, if the initial operating pressure were 90 psi, for example, the pressure in all three chamber 75, 97, 98 would equalize at about 85 psi, if allowed to do so.

Because the hollow piston rod 81 is sealed where it passes through the front cover 64 of the brake cylinder 63, chamber A 97 pressure acts on the piston head 78 with a larger effective area than the opposing chamber A 98 pressure. The difference in the area acted on by pressure on the face 79 of the piston head 78 and the area acted on by the pressure on the back side 80 of the piston head 78 is commonly referred to as the "area offset." Referring to FIGS. 6a and 6b, d1 could represent the diameter of the face 79 of the piston head 78 and d2 could represent the diameter of sliding air seal 96. The area of d2 would be the "offset area," since this is the area not acted upon by pressure in the release chamber R. Depending upon the actual areas selected, some minimum pressure, such as, for example, 10 to 20 psi, will be required on the effective offset area to produce sufficient force to overcome the resistance of the return spring 90 and sliding friction, causing full travel or extension of the piston 72. At the equalized pressure, such as, for example, 85 psi, the total output force of the piston 72 will be generally about equivalent to that of a heavy minimum service reduction with a conventional brake arrangement; again, depending on the specific area offset.

It should be noted that, during piston 72 movement, chambers A 97 and R 98 remain connected, by way of the reservoir 75, via valves V1 and V3, and most of the volume of air originally residing in chamber R 98 is effectively transferred across the piston to expanded chamber A 97, with only a modest increase in total volume and therefore minimal loss of initial pressure. The increase in pressurized volume in going from release to applied position consists of the clearance volume of chamber A 97 (in release) plus the area offset multiplied by the piston stroke. The relatively small volume made up of the area offset multiplied by the piston stroke represents the displacement volume (theoretically pressurized from a complete vacuum created by piston displacement). In this case, the area offset is equal to the area of the front seal 96 on the push rod 81, because that is the area not acted upon by the pressure in chamber R 98 in opposition to chamber A 97. Also, the relatively large brake cylinder 63 can reduce the overall rigging lever ratio required to achieve the desired braking ratio, in turn, minimizing the piston stroke necessary to take up a given brake shoe-to-wheel clearance.

Once the piston travel has been completed and the minimum braking force established, V1 can be operated to isolate chamber R 98 from the reservoir 75, and thus chamber A 97. In this applied position, the volume remaining in chamber R 98 can be minimal as a result of the piston 72 travel. In order to exert increasing braking force, the pressure in this small volume of chamber R 98 can be exhausted via valve V4 to atmosphere, to whatever extent is needed or desired. It should be noted that at this degree of piston travel the piston-travel interlock valve 114 is open, connecting chamber R to valve V4. If chamber R 98 pressure is completely exhausted, as it could be during an emergency application, the maximum effective pressure acting across the full area of the face of the piston head 78 will be the original equalization pressure, or about 85 psi. This is comparable to the maximum emergency brake cylinder pressure of about 78 psi produced with a conventional reservoir and brake cylinder.

For any application heavier than a minimum application, chamber R 98 pressure can be supplied or exhausted to maintain a target pressure, which can be a function of chamber A 97 pressure and the degree of application commanded. During a brake application, the pressure in the reservoir 75 can be continuously charged from the brake pipe 10 via charging check valve 111 to raise it back to about 90 psi and generally maintain it at that pressure. Valve V3 can be used to either maintain chamber A 97 at 85 psi, or to gradually increase it back to 90 psi during a sustained brake application by connecting chamber A 97 to the reservoir 75 via valve V3. If such recharge is desired in system design, chamber R 98 pressure could also be recharged to a controlled degree by connecting chamber R 98 to the reservoir 75 via valve V1, in order to maintain the desired cylinder output force while recharging chamber A 97. This may be different during an emergency application.

In order to graduate brake pressure off, to reduce the effective braking force, it can be necessary only to re-charge chamber R 98 to whatever degree is desired, which can be accomplished using valve V1. The system can be very efficient in terms of minimizing compressed air usage due to the relatively small volume of chamber R 98 when the piston 72 is in the applied position. The effective braking force may be reduced from any point, up to and including a maximum application, all the way down to essentially zero braking force, simply by restoring chamber R 98 pressure to the extent needed to obtain the particular level of braking desired. Unless chamber R 98 pressure is increased somewhat above that of chamber A 97, the piston will remain in the applied position due to the effective area advantage of chamber A 97 over chamber R 98. Braking force may, in fact, be repeatedly graduated on and off to any desired degree simply by exhausting and recharging the small chamber R 98 volume.

When a complete release to a fully retracted running position is desired, chamber R 98 can be recoupled with the reservoir 75, and chamber A 97 pressure can be isolated and reduced by connecting it to exhaust. This step can result in a more significant air loss than any other, because the substantial volume of applied chamber A 97 must be exhausted to below 40 psi in order to fully retract the piston 72 under the influence of the return spring 90. Consequently, a full release would be made only when it is anticipated that there will be no need for subsequent brake applications for some time. As long as a very minimal application is maintained, so that the piston 72 does not retract, higher braking forces can be reapplied with only minimal air usage from the system.

According to one embodiment, four valve operating positions are provided; release, transition, application and application lap. Transition occurs both during piston movement from release to applied position when an application is initiated, and during graduated release. In transition, the positions of all valves V1–V4 are intermittently the same regardless of which transition condition is occurring, but the effect differs due to the prevailing pressures. The following chart indicates the individual valve positions for each of these conditions.

|  | Reservoir 75 Chamber R 98 | Chamber A 97 | Atmosphere |
|---|---|---|---|
| Full Release | [_____V2 Open_____] [_____V1 Open_____] | | |
| Transition | [____V3 Open____] [_____V1 Open_____] | | |
| Application | [____V3 Open____] | | [____V4 Open____] |
| Application Lap | [____V3 Open____] | | |

In release position chamber A 97 is opened to atmosphere, allowing the return spring 90 to move the piston 72 to its fully retracted position. The reservoir 75 is connected to chamber R 98 and both are fully charged to the operating brake pipe 10 pressure.

Transition position applies to both initial piston 72 movement and to graduated release. Piston 72 movement is initiated when an application is made, by connecting the reservoir 75 to chamber A 97 while still connected to chamber R 98. The pressure in chamber A. 97 is increased sufficiently to fully displace the piston 72 and drive the brake shoes against the wheels. Because of the effective area advantage of chamber A. 97 over chamber R 98, full piston 72 movement can occur before chamber A 97 pressure is increased to that of chamber R 98. Depending on the prevailing pressures, the charging of chamber A 97 can be controlled to produce the exact amount of desired cylinder output force, even for light minimum applications. At higher prevailing pressures, minimum application forces will be reached prior to equalizing chamber A 97 with chamber R. 98, whereas at lower pressures or for heavier applications, it may be necessary to equalize the pressures and possibly reduce chamber R 98 pressure to meet force requirements. During graduated release, transition position charges chamber R 98 instead of chamber A 97.

Application position connects chamber A 97 to the reservoir 75 to increase the pressure in chamber A 97 to the desired application force. Additionally, chamber R 98 is isolated from the reservoir 75 and opened to exhaust, as needed, to reduce chamber R 98 pressure to derive the desired application force. The pneumatic interlock valve 114 is arranged in series with solenoid V4, so that chamber R 98 pressure cannot be exhausted until the piston 72 movement has been essentially completed.

In application lap, the chamber R 98 exhaust is closed and target pressures are maintained.

The unitized brake equipment 60 can also be more efficient in the application of air pressure to produce braking force. From any given pressure, the unitized brake equipment 60 with a self-actuating brake cylinder 63 can be capable of generating approximately 9% higher maximum (emergency) effective brake cylinder pressure, in substantially larger brake cylinders, with only about one-third as much stored air volume as conventional reservoirs. Furthermore, using a 12-inch diameter brake cylinder 63 with a 5- to 6-inch piston stroke, the 2000 cubic inch volume of stored air in the unitized brake equipment 60 can produce more than 50% higher maximum cylinder output force than the conventional brake equipment produces with a 10-inch brake cylinder. Using a reduced rigging lever ratio (in conjunction with the shorter piston stroke), the maximum net brake shoe force on the railcar would still be approximately 35% higher using the unitized brake equipment 60.

This would enable higher loaded car braking ratios, which would not cause excessive in-train forces with electronic signal transmission.

A train of railcars equipped with the unitized brake equipment 60 can provide the capability for fully graduable brake applications and releases, while utilizing far less compressed air than a conventionally equipped train. Because much less cumulative air volume would need to be delivered through the train brake pipe 10 using the unitized brake equipment 60, train charging times could also be dramatically reduced.

In a certain embodiment, pressures in the reservoir 75 and both chambers A 97 and R 98 can be controlled electronically by the four solenoid valves V2–V4, for example, under the direction of a CCD 38 which receives command signals 48 from a controller 49 via the wire line 11 or RF communication system 12, as described previously in connection with FIG. 1b. The CCD 38, and/or the controller, can be a computer or other processing equipment. Valve leads L1–L4 can be electrically connected in a known manner to the CCD 38 actuating the corresponding solenoid valves V1–V4. Alternatively, the valve leads L1–L4 could be simply be hardwired to an interface provided onboard the railcar, and the interface could be connected to the controller 49 via the wireline 11 or RF communication system 12. In any case, it is to be understood that various ways of communicating with and controlling the solenoid valves V1–V4 on the railcars, whether using both a CCD 38 and controller 49, or simply hardwiring the electrically operated valves V1–V4 for direct control by the controller 48, can be accomplished employing conventional methods, such as currently being used in prior art ECP braking systems like that described above in connection with FIG. 1b. Moreover, feedback from one or more sensors 150, 153, 156, for example, pressure transducers, can also be provided to either or both the CCD 38 and the controller 49. Like the electrical leads L1–L4 of the solenoid valves V1–V4, leads 160, 163 and 166 of the pressure sensors 150, 153, 156, can be similarly connected to the CCD 38 or controller 49 to provide feedback regarding the prevailing pressure in each of the air volumes 75, 97, 98, or other pressures, such as in the brake pipe 10, in order to implement what is commonly referred to as "closed-loop" control over the braking functions on the railcars.

In accord with AAR practice, brake commands to each car can call for (1) a brake release, (2) a percentage of full service, or (3) an emergency application, the maximum brake available. These commands can be interpreted and translated into a net shoe force requirement on each car. The proper pressures in chambers A 97 and R 98 can then be determined based upon appropriate equations. Whatever type of controller or control devices are utilized, it could be programmed with the appropriate equations for calculating the desired shoe force, and for controlling the electronic control valve portion to provide the proper pressure in the various chambers and reservoir. Various equations for making such calculations are provided below, near the end of the description.

The following tables are spreadsheet calculations of chambers A 97 and R 98 pressures and corresponding output forces for the a preferred 12-inch brake cylinder 69. Table 1 shows the brake cylinder output forces for pressure equalization of chambers A 97 and R 98, as well as the maximum cylinder output force, for various piston offset areas, from 5 to 13 square inches. These calculations are based on 90 psi initial pressure. The equivalent pressure required in a standard 10-inch brake cylinder with a conventional brake equipment is also shown for both the light applications derived from equal pressures in A 97 and R 98 and for maximum applications. Additionally, Table 1 shows the theoretical equalization pressure required to yield 300 pounds cylinder output force with the various unbalanced piston areas.

When equalization of chamber R 98 with the reservoir 75 and chamber A 97 is used as a minimum or light service application, the equivalent 10-inch cylinder pressure varies from 3.63 to 11.3 psi, as the piston offset area is increased from 5 to 13 square inches, respectively. This suggests that, if it is desired to use a simple pressure equalization for minimum applications, the offset area should be approximately 10 square inches, yielding a braking force equal to that which would be obtained with about 8.5 psi in a conventional 10-cylinder. This equalization force output would vary some, however, if initial pressures other than 90 psi were used.

Table 2 fixes the piston offset area at 12.566 square inches, representing a 4-inch diameter seal on the push rod 81. This piston offset area was found to be an optimum balance for minimizing air usage on one hand, and both for providing application capability at the lowest charge pressure and providing a rapid piston movement in emergency on the other hand. Preferably, the pressure in chamber R 98 should not be reduced to provide high emergency braking force until full piston travel has been completed. This is because that exhausting chamber A 98 to produce high braking forces, prior to full piston travel, would waste much air, and thus reduce the available chamber A 97 pressures that could otherwise be provided. Therefore, the only force available to actually move the piston 72 is the offset piston area times the equalized pressure in both chambers A 97 and R 98. It is also desirable to move the piston 72 as fast as possible during an emergency application. Table 2 also shows the brake cylinder output force for light applications, where chamber A 97 pressure is charged to a range of pressures from 80 psi up to 85.2 psi, which is the equalization pressure from 90 psi. The net cylinder force varies from 218 pounds up to 1070.8 pounds, respectively. Equivalent pressures for a conventional 10-inch cylinder are also shown for each case. Using this cylinder arrangement, the ideal chamber A 97 pressure for a light minimum application would be 83.5 to 84 psi, which is below the full equalization pressure of 85.2 psi.

Table 3 shows the chamber A 97 pressure required to produce approximately 700 pounds cylinder output force for initial pressures ranging from 50 to 10 psi. Table 4 is a worksheet, and Table 5 shows the chamber A 97 pressures which will produce nominally 600 pounds cylinder output force. It is believed that 600 pounds net cylinder output force is about ideal for a true minimum application with electronic brakes.

Table 6 is a worksheet used to derive an equation to closely approximate the ideally desired chamber A 97 pressure with this cylinder arrangement (12-inch main piston 72 with 4-inch push rod 81) for any initial pressure. The equation is intended to match the chamber A 97 pressures indicated on the previous third chart, and it is:

$$P_A = P_e * (2000 - P_i)/1950$$

Where: $P_A$ = Chamber A pressure
$P_e$ = equalization pressure
$P_i$ = initial pressure at time of application The equalization pressure, $P_e$, is easily calculated from the initial pressure and the pressure-volume relationships that exist. The equation is only applied for initial pressures above 70 psi, where equalization would produce excessive cylinder output force. Below this pressure, chamber A 97 is allowed to equalize with the reservoir 75 and chamber R 98. Chamber R 98 pressure can be exhausted as needed to produce the target force output of 600 pounds. As indicated, at initial pressures of 70 and 80 psi the equation derived yields values slightly lower than the exact theoretically desired $P_A$ pressure, which produces cylinder forces of 562 and 587.5 pounds, respectively. These forces are within 10% of the target and are considered acceptable for minimum applications, since they can be increased as desired by the operator simply by commanding a slightly heavier service application.

Table 7 illustrates equalization pressures and chamber R 98 pressures for full service and emergency applications, for initial pressures ranging from 50 to 110 psi. In emergency, chamber R 98 is exhausted to zero (gauge) or atmospheric pressure, producing the maximum available cylinder output force. For the maximum service application, chamber R 98 pressure is exhausted to a pressure required to produce 19% lower cylinder output force than the corresponding emergency application.

Table 8 compares the target pressure in chamber R 98 to the pressure computed by the derived equation, and Table 9 simply shows the equalization pressure for various initial pressures and the corresponding chamber A 97 pressure required to derive just sufficient force to bring about full piston travel. This is significant, because chamber R 98 should not be exhausted to produce high braking forces until full piston travel has been completed. Otherwise, much air would be wasted and available chamber A 97 pressures reduced. The chart shows that with the selected area offset, the full piston travel can be obtained with an initial pressure as low as 12 psi, providing an equalization pressure of 10.9 psi. Finally, Table 10 duplicates the information in Table 7, except that the simplified equation Pi/4.4 is used for $P_R$.

TABLE 1

Self-Actuating ECP Brake Cylinder

| 90 psi Main Pist. Diameter | Main Pist. Area | Off-Set Area | Spring | Sys. Vol. | P to yield 300 lbs | Equal. Press | Min Application Equal. Force* | Equiv. Min. P. # | (Net Theoretical) Max Forc Output | Equiv. 10" BCP | Managed P Reduct. For rel. | Lever Ratio Req'd.** |
|---|---|---|---|---|---|---|---|---|---|---|---|---|
| 12 | 113.097 | 5.0 | 120 | 2000 | 84.0 | 87.42 | 286.5 | 3.65 | 9062 | 123.1 | 2.9 | 6.25 |
| 12 | 113.097 | 6.0 | 120 | 2000 | 70.0 | 87.12 | 366.1 | 4.66 | 9031 | 122.6 | 7.7 | 6.27 |
| 12 | 113.097 | 7.0 | 120 | 2000 | 60.0 | 86.83 | 445.2 | 5.67 | 9000 | 122.2 | 11.1 | 6.29 |
| 12 | 113.097 | 7.5 | 120 | 2000 | 56.0 | 86.68 | 484.6 | 6.17 | 8984 | 122.0 | 12.5 | 6.30 |
| 12 | 113.097 | 8.0 | 120 | 2000 | 52.5 | 86.53 | 523.8 | 6.67 | 8969 | 121.8 | 13.6 | 6.32 |
| 12 | 113.097 | 9.0 | 120 | 2000 | 46.7 | 86.24 | 601.8 | 7.66 | 8938 | 121.4 | 15.6 | 6.34 |
| 12 | 113.097 | 10.0 | 120 | 2000 | 42.0 | 85.95 | 679.3 | 8.65 | 8908 | 121.0 | 17.1 | 6.36 |
| 12 | 113.097 | 11.0 | 120 | 2000 | 38.2 | 85.66 | 756.3 | 9.63 | 8877 | 120.6 | 18.3 | 6.38 |
| 12 | 113.097 | 12.0 | 120 | 2000 | 35.0 | 85.37 | 832.8 | 10.60 | 8847 | 120.2 | 19.3 | 6.40 |
| 12 | 113.097 | 13.0 | 120 | 2000 | 32.3 | 85.09 | 908.7 | 11.57 | 8817 | 119.8 | 20.2 | 6.42 |
| 12 | 113.097 | 12.6 | 120 | 2000 | 33.4 | 85.211 | 875.8 | 11.15 | 8830 | 120.0 | 19.8 | 6.41 |

TABLE 2

Partial Pressure Admitted to Chamber A for Light Applications

| Main Pist. Diameter | Main Pist. Area | Off-Set Area | Spring | Sys. Vol. | Equalized P to yield 300 lbs | Equal. Press | Chamb-A Press. | Chamb-R Press. | Output Force | Equiv. Min. P. |
|---|---|---|---|---|---|---|---|---|---|---|
| 12 | 113.097 | 12.566 | 120 | 2000 | 33.4 | 85.21 | 80 | 87.83 | 218.0 | 1.12 |
| 12 | 113.097 | 12.566 | 120 | 2000 | 33.4 | 85.21 | 81 | 87.33 | 381.6 | 3.00 |
| 12 | 113.097 | 12.566 | 120 | 2000 | 33.4 | 85.21 | 82 | 86.83 | 545.3 | 4.87 |
| 12 | 113.097 | 12.566 | 120 | 2000 | 33.4 | 85.21 | 83 | 86.32 | 709.0 | 6.75 |
| 12 | 113.097 | 12.566 | 120 | 2000 | 33.4 | 85.21 | 83.5 | 86.07 | 790.8 | 7.69 |
| 12 | 113.097 | 12.566 | 120 | 2000 | 33.4 | 85.21 | 84 | 85.82 | 872.6 | 8.62 |
| 12 | 113.097 | 12.566 | 120 | 2000 | 33.4 | 85.21 | 85 | 85.32 | 1036.3 | 10.50 |
| 12 | 113.097 | 12.566 | 120 | 2000 | 33.4 | 85.21 | 85.21 | 85.21 | 1070.8 | 10.90 |

Calculations based on 90 psi.
*Theoretical net force
**Lever ratio to yield 12% NBR for full service on 295,000 lb. Car.
Accounts for lower lever ratio required with 12" cylinder and higher available pressures.

TABLE 3

Partial Pressure Adinitted to Chamber A for Light Applications

| Main Pist. Diameter | Initial Pressure | Main Pist. Area | Off-Set Area | Spring | Sys. Vol. | Equalized P to yield 300 lbs | Equal. Press | Chamb-A Press. | Chamb-R Press. | Output Force | Equiv. Min. P. # |
|---|---|---|---|---|---|---|---|---|---|---|---|
| 12 | 50 | 113.097 | 12.566 | 120 | 2000 | 33.4 | 47.10 | 47.10 | 46.024 | 700.00 | 8.21 |
| 12 | 60 | 113.097 | 12.566 | 120 | 2000 | 33.4 | 56.63 | 56.63 | 56.631 | 711.65 | 8.37 |

TABLE 3-continued

Partial Pressure Admitted to Chamber A for Light Applications

| Main Pist. Diameter | Initial Pressure | Main Pist. Area | Off-Set Area | Spring | Sys. Vol. | Equalized P to yield 300 lbs | Equal. Press | Chamb-A Press. | Chamb-R Press. | Output Force | Equiv. Min. P. # |
|---|---|---|---|---|---|---|---|---|---|---|---|
| 12 | 70  | 113.097 | 12.566 | 120 | 2000 | 33.4 | 66.16  | 65.355   | 66.562  | 699.97 | 8.20 |
| 12 | 80  | 113.097 | 12.566 | 120 | 2000 | 33.4 | 75.68  | 74.150   | 76.456  | 699.96 | 8.20 |
| 12 | 90  | 113.097 | 12.566 | 120 | 2000 | 33.4 | 85.21  | 82.945   | 86.351  | 699.95 | 8.20 |
| 12 | 100 | 113.097 | 12.566 | 120 | 2000 | 33.4 | 94.74  | 91.740   | 96.245  | 699.94 | 8.20 |
| 12 | 110 | 113.097 | 12.566 | 120 | 2000 | 33.4 | 104.26 | 100.5355 | 106.139 | 700.01 | 8.21 |

TABLE 4

Work-sheets for Relationships - A and R copied From TABLE 2.

| $P_i$ | 200-$P_i$ | Equal. Press-A | Press-A | % Eq. | Press-R | % Eq. | % Pa |
|---|---|---|---|---|---|---|---|
| 50  |     | 47.105  | 47.105  | 1.00   | 46.024  | 0.977 | 0.977 |
| 60  |     | 56.631  | 56.631  | 1.00   | 56.631  | 1.000 | 1.000 |
| 70  | 130 | 66.158  | 65.355  | 0.9879 | 66.562  | 1.006 | 1.018 |
| 80  | 120 | 75.684  | 74.150  | 0.9797 | 76.456  | 1.010 | 1.031 |
| 90  | 110 | 85.211  | 82.945  | 0.9734 | 86.351  | 1.013 | 1.041 |
| 100 | 100 | 94.737  | 91.740  | 0.9684 | 96.245  | 1.016 | 1.049 |
| 110 | 90  | 104.264 | 100.536 | 0.9642 | 106.139 | 1.018 | 1.056 |

TABLE 5

Chamber A Pressure Needed To Produce Nominally 600 lbs. Net Cylinder Force.

| Initial Pressure | Main Pist. Area | Off-Set Area | Spring | Equal. Press | Chamb-A Press.* | Chamb-R Press.** | Output Force | Equiv. Min. P. |
|---|---|---|---|---|---|---|---|---|
| 50  | 113.097 | 12.566 | 120 | 47.10  | 47.10  | 45.28  | 600.60 | 5.51 |
| 60  | 113.097 | 12.566 | 120 | 56.63  | 56.63  | 56.00  | 600.86 | 5.51 |
| 70  | 113.097 | 12.566 | 120 | 66.16  | 65.81  | 66.33  | 600.23 | 5.50 |
| 80  | 113.097 | 12.566 | 120 | 75.68  | 74.61  | 76.22  | 600.98 | 5.51 |
| 90  | 113.097 | 12.566 | 120 | 85.21  | 83.40  | 86.12  | 600.21 | 5.50 |
| 100 | 113.097 | 12.566 | 120 | 94.74  | 92.20  | 96.01  | 600.96 | 5.51 |
| 110 | 113.097 | 12.566 | 120 | 104.26 | 100.99 | 105.91 | 600.19 | 5.50 |

*Chamber-A equation derived to yield desired min application force when Pi over 60 psi.
(Equalization pressure used for initial pressures of 60 psi and below, with reduced R.)
**Chamber R equation based on P-V using given chamber-A pressure.

TABLE 6

Work-Sheet To Derive Equation For P-A To Obtain Desired Brake Application Force.

| $P_i$ | $P_e$ | Desired P-A | P-R | P-A Fact × Pe | P-A** Equation | P-R | Force |
|---|---|---|---|---|---|---|---|
| 50  | 47.105  | 47.100  | 45.280  | 1.000 | 47.08  | 45.26  | 600.43 |
| 60  | 56.631  | 56.631  | 56.000  | 1.000 | 56.31  | 55.65  | 600.00 |
| 70  | 66.158  | 65.810  | 66.333  | 0.995 | 65.45  | 66.33  | 561.91 |
| 80  | 75.684  | 74.160  | 76.225  | 0.986 | 74.48  | 76.22  | 587.49 |
| 90  | 85.211  | 83.400  | 86.122  | 0.979 | 83.42  | 86.12  | 602.33 |
| 100 | 94.737  | 92.200  | 96.014  | 0.973 | 92.26  | 96.01  | 607.37 |
| 110 | 104.264 | 100.990 | 105.911 | 0.969 | 101.00 | 105.91 | 601.67 |

**P-A = $P_e \cdot (2000-Pi)/1950$ (Use only for $P_i$ greater than 70 psi.)

TABLE 7

Maximum Emergency and Full Service Pressures and Forces

| Initial Pressure | Main Pist. Area | Off-Set Area | Equal. Press | Emerg. PA | Emerg. PR | Emerg. Cyl. Force | Equiv. 10" Press | F.S. PA | F.S. PR | F.S. Cyl. Force | Equiv. 10" Press | 10" Cyl. Em/F.S. |
|---|---|---|---|---|---|---|---|---|---|---|---|---|
| 50 | 113.097 | 12.566 | 47.10 | 47.10 | 0.00 | 4947 | 67.9 | 47.10 | 11.7 | 4036 | 55.7 | 1.182 |
| 60 | 113.097 | 12.566 | 56.63 | 56.63 | 0.00 | 5971 | 81.6 | 56.63 | 13.8 | 4895 | 67.2 | 1.187 |
| 70 | 113.097 | 12.566 | 66.16 | 66.16 | 0.00 | 6994 | 95.3 | 66.16 | 16.0 | 5755 | 78.7 | 1.190 |
| 80 | 113.097 | 12.566 | 75.68 | 75.68 | 0.00 | 8018 | 109.1 | 75.68 | 18.2 | 6615 | 90.3 | 1.193 |
| 90 | 113.097 | 12.566 | 85.21 | 85.21 | 0.00 | 9041 | 122.8 | 85.21 | 20.3 | 7475 | 101.8 | 1.195 |
| 100 | 113.097 | 12.566 | 94.74 | 94.74 | 0.00 | 10065 | 136.5 | 94.74 | 22.5 | 8334 | 113.3 | 1.196 |
| 110 | 113.097 | 12.566 | 104.26 | 104.26 | 0.00 | 11088 | 150.2 | 104.26 | 24.6 | 9194 | 124.8 | 1.197 |

TABLE 8

| Cylinder Diameter = 12" | Initial Pressure | F.S. P R | (To Match) $P_I/4.4$ |
|---|---|---|---|
| Return Spring = 120 lbs. | 50 | 11.66 | 11.34 |
| | 60 | 13.82 | 13.61 |
| | 70 | 15.99 | 15.87 |
| | 80 | 18.15 | 18.14 |
| | 90 | 20.32 | 20.41 |
| | 100 | 22.48 | 22.68 |
| | 110 | 24.65 | 24.94 |

TABLE 9

Min Pressures to displace piston.

| PI | P-equal. | P-A | P-R | Force |
|---|---|---|---|---|
| 12 | 10.90 | 10.900 | 10.906 | 6.8 |
| 35 | 32.81 | 31.087 | 33.684 | 0.5 |
| 70 | 66.16 | 61.870 | 68.315 | 0.5 |
| 90 | 85.21 | 79.460 | 88.104 | 0.5 |
| 110 | 104.26 | 97.050 | 107.893 | 0.5 |

TABLE 10

| Initial Pressure | Main Pist. Area | Off-Set Area | Equal. Press | Emerg. PA | Emerg. PR | Emerg. Cyl. Force | Equiv. 10" Press | F.S. PA | F.S. PR | F.S. Cyl. Force | Equiv. 10" Press | 10" Cyl. Em/F.S. |
|---|---|---|---|---|---|---|---|---|---|---|---|---|
| 50 | 113.097 | 12.566 | 47.10 | 47.10 | 0.00 | 4947 | 67.9 | 47.10 | 11.4 | 4065 | 56.1 | 1.191 |
| 60 | 113.097 | 12.566 | 56.63 | 56.63 | 0.00 | 5971 | 81.6 | 56.63 | 13.6 | 4914 | 67.5 | 1.191 |
| 70 | 113.097 | 12.566 | 66.16 | 66.16 | 0.00 | 6994 | 95.3 | 66.16 | 15.9 | 5763 | 78.8 | 1.192 |
| 80 | 113.097 | 12.566 | 75.68 | 75.68 | 0.00 | 8018 | 109.1 | 75.68 | 18.2 | 6612 | 90.2 | 1.192 |
| 90 | 113.097 | 12.566 | 85.21 | 85.21 | 0.00 | 9041 | 122.8 | 85.21 | 20.5 | 7461 | 101.6 | 1.192 |
| 100 | 113.097 | 12.566 | 94.74 | 94.74 | 0.00 | 10065 | 136.5 | 94.74 | 22.7 | 8310 | 113.0 | 1.193 |
| 110 | 113.097 | 12.566 | 104.26 | 104.26 | 0.00 | 11088 | 150.2 | 104.26 | 25.0 | 9159 | 124.4 | 1.193 |

Note: F.S. Chamber R Pressure calculated as $P_I/4.4$ to derive proper Emergency/Full Service ratio.

Equations
Cylinder Equalization Pressure:

$$P_e = (2000*(P_I+14.7)+V_c*14.7)/(2000+P_T*a+V_c)-14.7 \quad (1.)$$

Where: $P_e$=equalization pressure for the reservoir and chamber A with R
$V_c$=total clearance volume (chamber A in release)
$P_T$=piston travel (typically 6 inches)
a=area of push rod seal (offset piston area—12.566 sq. in.)
Chamber A Pressure for Minimum Applications:

$$P_A = P_e*(2000-P_I)/1950 \quad (2.)$$

Where: $P_A$ chamber A pressure
$P_e$=equalization pressure (from equation (1.))
$P_I$=initial pressure
Chamber A Pressure for all Other Applications, Including Emergency:

$$P_A = P_e \quad (3.)$$

Where: $P_A$=chamber A pressure
$P_e$=equalization pressure
Chamber R Pressure for Minimum Applications:

$$P_R = 2000*(P_I+14.7)+V_c*14.7-(A*P_T+a)*(P_A+14.7)/(2000-P_T*(A-a)-14.7 \quad (4.)$$

Where: $P_R$ chamber R pressure
$P_I$=initial pressure
$V_c$=clearance volume (24 cubic inches)
$P_A$=chamber A pressure
$P_T$=piston travel (typically 6 inches)
A=main piston area (113.097 sq. in. for 12". cylinder)
a=area of push rod seal (offset area—12.566 sq. in.)
Note: This pressure can be calculated, but need not be for brake applications. It is the pressure in chamber R that will result from feeding reservoir and chamber R into chamber A to charge chamber A to less than equalization.

Chamber R Pressure for all Service Applications Heavier than Minimum and Lighter than Full Service:

$$P_R = (P_A*A-F)/(A-a) \quad (5.)$$

Where: $P_R$=chamber R pressure
$P_A$=chamber A pressure
A=main piston area (113.097 sq. in.)
a=push rod seal area (12.566 sq. in.)
F=cylinder output force
Chamber R Pressure for Full Service Applications:

$$P_R = P_I/4.4 \quad (6.)$$

Where: $P_R$ chamber R pressure $P_i$ initial pressure

Net Cylinder Output force:

$$F = P_A * A - P_R * (A-a) - F_s \quad (7.)$$

Where: F cylinder output force in pounds $P_A$ = chamber A pressure $P_R$ = chamber R pressure A = main piston area (113.097 sq. in.)

a = push rod seal area (12.566 sq. in.)

$F_s$ = return spring force (nominally 120 lbs.)

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. Unitized brake equipment for a railcar comprising:
   a. a brake cylinder;
   b. a single piston having a piston head end movably housed in said brake cylinder and a piston rod end connectable to a brake member for applying braking force on said railcar;
   c. a first volume communicating on at least a portion of a first side of said piston head, pressurization of said first volume causing said single piston to move in a first direction to increase braking force on said railcar;
   d. a second volume communicating on at least a portion of a second side of said piston head, pressurization of said second volume tending to cause said single piston to move in a second direction to decrease braking force on said railcar; and
   e. a control valve portion controllable responsive to an electrical brake signal selectively coupling at least one of said first and second volumes with at least one of each other, a source of pressure, and the atmosphere to control pressure in said first and second volumes and move said single piston to control braking force on said railcar in a graduable manner;
   f. a third volume connectable via said a control valve portion to at least one of said first volume, said second volume, and said source of pressure;
   g. wherein said control valve portion further comprises a valve between said second volume and the atmosphere, and a piston travel interlock valve between said valve and atmosphere, said piston travel interlock valve movable between first and second positions responsive to travel of said single piston, said piston travel interlock valve isolating said second volume from said valve in said first position and connecting said second volume to said valve in said second position, said second position corresponding to a predetermined amount of travel of said single piston in said first direction.

2. Unitized brake equipment for a railcar comprising:
   a. a brake cylinder;
   b. a single piston having a piston head end movably housed in said brake cylinder and a piston rod end connectable to a brake member for applying braking force on said railcar;
   c. a first volume communicating on at least a portion of a first side of said piston head, pressurization of said first volume causing said single piston to move in a first direction to increase braking force on said railcar;
   d. a second volume communicating on at least a portion of a second side of said piston head, pressurization of said second volume tending to cause said single piston to move in a second direction to decrease braking force on said railcar; and
   e. a control valve portion controllable responsive to an electrical brake signal selectively coupling at least one of said first and second volumes with at least one of each other, a source of pressure, and the atmosphere to control pressure in said first and second volumes and move said single piston to control braking force on said railcar in a graduable manner;
   f. a third volume connectable via said a control valve portion to at least one of said first volume, said second volume, and said source of pressure;
   g. wherein said control valve portion comprises
      i. a first valve controllable to connect said first volume with at least said reservoir to pressurize said first volume;
      ii. a second valve controllable to connect said second volume with at least said reservoir to pressurize said second volume;
      iii. a third valve controllable to connect said first volume to the atmosphere to depressurize said first volume; and
      iv. a fourth valve controllable to connect said second volume to the atmosphere to depressurize said second volume; and
   h. wherein said first through fourth valves are first through fourth electrically controlled pilot valves and further comprising:
      i. a first booster valve associated said first pilot valve and said source of pressure providing pilot pressure;
      ii. a second booster valve associated said second pilot valve, said reservoir providing pilot pressure;
      iii. a third booster valve associated said third pilot valve, said reservoir providing pilot pressure; and
      iv. a fourth booster valve associated said fourth pilot valve, said source of pressure providing pilot pressure.

3. The unitized brake equipment of claim 2 further comprising said third booster valve connecting said single volume with atmosphere when said third pilot valve is energized and isolating said single volume from atmosphere when said third pilot valve is de-energized.

4. The unitized brake equipment of claim 3 further comprising:
   a. said piston travel interlock valve having an operating valve stem;
   b. a beveled stem having a first end projecting into said second volume and a second end abutting an end of said operating valve stem, said second end having a beveled portion; and
   c. said first end of said beveled stem engagable by said piston after said predetermined amount of travel of said single piston, said beveled portion causing movement of said operating valve stem responsive to said piston moving said beveled stem, movement of said operating valve stem causing said piston travel interlock valve to move between said first and second positions.

5. The unitized brake equipment of claim 2 further comprising said first booster valve connecting said single volume to said third volume responsive to a predetermined pressure loss in said source of pressure notwithstanding an operating condition of said third pilot valve.

6. Unitized brake equipment for a railcar comprising:
   a. a brake cylinder;
   b. a single piston having a piston head movably housed in said brake cylinder and a piston rod end connectable to a brake member for applying braking force on said railcar;
   c. a first volume communicating on at least a portion of a first side of said piston head, pressurization of said first volume causing said single piston to move in a first direction to increase said braking force;
   d. a second volume communicating on at least a portion of a second side of said piston head, pressurization of said second volume causing said single piston to move in a second direction to decrease said braking force;
   e. a third volume connectable to a source of pressure;
   f. a first electrically controllable valve to selectively couple said first volume with at least said third volume to gradually pressurize said first volume;
   g. a second electrically controllable valve to selectively couple said second volume with at least said third volume to gradually pressurize said second volume;
   h. a third electrically controllable valve to selectively couple said first volume to the atmosphere to gradually depressurize said first volume; and
   i. a fourth electrically controllable valve to selectively couple said second volume to the atmosphere to gradually depressurize said second volumes,
   j wherein said first through fourth electrically controllable valves are first through fourth electrically controllable pilot valves and further comprising:
      i. a first booster valve associated said first pilot valve and said source of pressure providing pilot pressure;
      ii. a second booster valve associated said second pilot valve, said third volume providing pilot pressure;
      iii. a third booster valve associated said third pilot valve, said third volume providing pilot pressure; and
      iv. a fourth booster valve associated said fourth pilot valve, said source of pressure providing pilot pressure.

7. A method of controlling braking force on a railcar comprising:
   a. controlling movement of a single piston having a piston head end slidably disposed in a brake cylinder and a rod end connectable to a brake member on said railcar such that movement of said piston controls said braking force;
   b. providing a first volume acting on at least a portion of a first side of said piston head and a second volume acting on a second side of said piston head;
   c. providing a third volume integral with said brake cylinder;
   d. selectively connecting at least one of said first volume and said second volume to at least one of each other, a source of pressure said third volume, and the atmosphere to control movement of said single piston to control braking force on said rail car;
   e. at least one of;
      i. isolating said first volume from atmosphere responsive to a pressure reduction in said source of pressure,
      ii. isolating said second volume from the atmosphere while connecting said first volume to said source of pressure to increase said braking force until a predetermined amount of travel of said single piston has occurred, and thereafter selectively connecting said second volume to atmosphere to gradually reduce pressure in said second volume to further increase said braking force; and
      iii. selectively transferring pressure between said first and second volumes by connecting said first and second volumes to said third volume;
   wherein movement of said single piston is controlled using a plurality of electrically controlled valves to control pressure in said first and second volumes by at least one of:
      i. selectively connecting said first volume with at least said third volume to pressurize said first volume using a first electrically operated valve;
      ii. selectively connecting said second volume with at least said third volume to pressurize said second volume using a second electrically operated valve;
      iii. selectively connecting said first volume to the atmosphere to depressurize said first volume using a third electrically operated valve; and
      iv. selectively connecting said second volume to the atmosphere to depressurize said second volume using a fourth electrically operated valve; and
   f. wherein said first through fourth electrically operated valves are first through fourth electrically operated pilot valves, and further comprising:
      i. controlling a first booster valve with said first pilot valve and using said source of pressure as a source of pilot pressure;
      ii. controlling a second booster valve with said second pilot valve and using said third volume as a source of pilot pressure;
      iii. controlling a third booster valve with said third pilot valve and using said third volume as a source of pilot pressure; and
      iv. controlling a fourth booster valve with said fourth pilot valve and using said source of pressure as a source of pilot pressure.

8. A method of controlling braking force on a railcar comprising:
   a. controlling movement of a piston having a piston head end slidably disposed in a brake cylinder and a rod end connectable to a brake member on said railcar such that movement of said piston in a first direction increases said braking force and movement of said piston in a second direction reduces said braking force;
   b. providing a single application chamber acting on a first side of said piston head, a single release chamber acting on a second side of said piston head, and a reservoir;
   c. sealing said piston head against said brake cylinder at a single location such that said application and release chambers are separated using a single seal;
   d. selectively connecting at least one of said first and second pressure chambers to at least one of each other, a source of pressure, said reservoir, and the atmosphere to move said piston in said first and second directions to control said braking force; and
   e. isolating said release chamber from said reservoir and connecting said release chamber to atmosphere responsive to piston travel a certain distance in said first direction and a predetermined reduction in pressure at said pressure source.

9. The method of claim 8 further comprising isolating said application chamber from atmosphere and connecting said application chamber to said reservoir responsive to a predetermined reduction in pressure at said pressure source.

10. Unitized brake equipment for a railcar comprising:
a. a brake cylinder;
b. a single piston having a piston head end movably housed in said brake cylinder and a piston rod end connectable to a brake member for applying braking force on said railcar;
c. a first volume communicating on at least a portion of a first side of said piston head, pressurization of said first volume causing said single piston to move in a first direction to increase braking force on said railcar;
d. a second volume communicating on at least a portion of a second side of said piston head, pressurization of said second volume tending to cause said single piston to move in a second direction to decrease braking force on said railcar; and
e. a control valve portion controllable responsive to an electrical brake signal selectively coupling at least one of said first and second volumes with at least one of each other, a source of pressure, and the atmosphere to control pressure in said first and second volumes and move said single piston to control braking force on said railcar in a graduable manner;
f. a third volume connectable via said a control valve portion to at least one of said first volume, said second volume, and said source of pressure;
g. wherein said control valve portion further comprises a valve having a normally open state wherein said first volume is connected to atmosphere and wherein said valve isolates said first volume from atmosphere when in an activated state; and
h. a cut-off valve connected in series between said valve and the atmosphere, said cut-off valve held normally open to atmosphere by said source of pressure, said cut-off valve isolating said valve and thus said first volume from atmosphere responsive to a predetermined loss of pressure in said source of pressure notwithstanding the state of said valve.

\* \* \* \* \*